US010306025B2

(12) United States Patent
Ripke

(10) Patent No.: US 10,306,025 B2
(45) Date of Patent: May 28, 2019

(54) METHOD OF MANAGING AN MPTCP CONNECTION AND NETWORK DEVICE

(71) Applicant: NEC Europe Ltd., Heidelberg (DE)

(72) Inventor: Andreas Ripke, Neckargemuend (DE)

(73) Assignee: NEC CORPORATION, Tokyo (JP)

( * ) Notice: Subject to any disclaimer, the term of this patent is extended or adjusted under 35 U.S.C. 154(b) by 114 days.

(21) Appl. No.: 15/521,897

(22) PCT Filed: Oct. 27, 2014

(86) PCT No.: PCT/EP2014/073013
§ 371 (c)(1),
(2) Date: Apr. 26, 2017

(87) PCT Pub. No.: WO2016/066184
PCT Pub. Date: May 6, 2016

(65) Prior Publication Data
US 2017/0318130 A1 Nov. 2, 2017

(51) Int. Cl.
*G06F 15/16* (2006.01)
*H04L 29/06* (2006.01)
*H04N 21/2381* (2011.01)
*H04L 12/707* (2013.01)
*H04N 21/462* (2011.01)
*H04N 21/63* (2011.01)
*H04N 21/643* (2011.01)
*H04L 29/08* (2006.01)

(52) U.S. Cl.
CPC .............. *H04L 69/16* (2013.01); *H04L 45/24* (2013.01); *H04L 69/14* (2013.01); *H04N 21/2381* (2013.01); *H04N 21/4622* (2013.01); *H04N 21/631* (2013.01); *H04N 21/64322* (2013.01); *H04L 67/141* (2013.01); *H04L 67/42* (2013.01)

(58) Field of Classification Search
CPC ......... H04L 69/16; H04L 45/24; H04L 69/14; H04L 67/141; H04L 67/42; H04N 21/2381; H04N 21/4622; H04N 21/631; H04N 21/64322
See application file for complete search history.

(56) References Cited

U.S. PATENT DOCUMENTS

| | | | | |
|---|---|---|---|---|
| 9,456,464 B2* | 9/2016 | Biswas | | H04L 45/24 |
| 9,578,109 B2* | 2/2017 | Biswas | | H04L 67/142 |
| 9,762,702 B2* | 9/2017 | Biswas | | H04W 76/10 |
| 9,948,725 B2* | 4/2018 | Biswas | | H04L 45/24 |

(Continued)

OTHER PUBLICATIONS

Juhoon Kim, Ramin Khalili, Anja Feldmann, Yung-Chih Chen, Don Towsley: "Multi-Source Multipath HTTP (mHTTP): A Proposal", Cornell University Library, Dec. 10, 2013 (Dec. 10, 2013), pp. 1-12, XP002741021.

(Continued)

*Primary Examiner* — Moustafa M Meky
(74) *Attorney, Agent, or Firm* — Leydig, Voit & Mayer, Ltd.

(57) ABSTRACT

A method of managing a multipath TCP (MPTCP) connection includes establishing the MPTCP connection as a logical connection between end-points that utilizes multiple network paths with one TCP subflow per network path. At least two subflows of the MPTCP connection are terminated at different end-points.

14 Claims, 3 Drawing Sheets

(56) References Cited

U.S. PATENT DOCUMENTS

| | | | | |
|---|---|---|---|---|
| 2015/0237525 A1* | 8/2015 | Mildh | ............... | H04W 28/0215 |
| | | | | 370/230.1 |
| 2015/0281367 A1* | 10/2015 | Nygren | ................ | H04L 47/193 |
| | | | | 709/228 |
| 2016/0360557 A1* | 12/2016 | Lavi | ...................... | H04W 76/10 |
| 2016/0366049 A1* | 12/2016 | Achouri | .................. | H04L 45/24 |
| 2016/0373533 A1* | 12/2016 | Biswas | ................... | H04L 45/24 |
| 2017/0085484 A1* | 3/2017 | Hellander | ............... | H04L 69/14 |
| 2017/0104717 A1* | 4/2017 | Vesterinen | ............. | H04W 8/26 |
| 2017/0188407 A1* | 6/2017 | Zee | ......................... | H04L 69/14 |
| 2017/0231018 A1* | 8/2017 | Hahn | ................... | H04W 76/10 |

OTHER PUBLICATIONS

Anonymous: "RFC 6824—TCP Extensions for Multipath Operation with Multiple Addresses", Jan. 1, 2013 (Jan. 1, 2013), XP055195765.

* cited by examiner

METHOD OF MANAGING AN MPTCP CONNECTION AND NETWORK DEVICE

CROSS REFERENCE TO RELATED APPLICATIONS

This application is a U.S. National Stage Application under 35 U.S.C. § 371 of International Application No. PCT/EP2014/073013 filed on Oct. 27, 2014. The International Application was published in English on May 6, 2016 as WO 2016/066184 A1 under PCT Article 21(2).

FIELD

The present invention relates to a method of managing a multipath TCP, MPTCP, connection, wherein said MPTCP connection is established as a logical connection between end-points that utilizes multiple network paths with one TCP session-subflow-per network path.

Furthermore, the present invention relates to a network device, said network device being configured to act as an end-point in a multipath TCP, MPTCP, connection, wherein said MPTCP connection is established as a logical connection between end-points that utilizes multiple network paths with one TCP session-subflow-per network path.

BACKGROUND

Until recently, TCP/IP communication was restricted to a single path per connection, yet multiple paths often exist between network devices or peers. The simultaneous use of these multiple paths for a TCP/IP session would improve resource usage within the network and, thus, improve user experience through higher throughput and improved resilience to network failure. To this end, a multipath TCP technology, called MPTCP, has been developed in the IETF. Details of this technology, as assumed and understood in the context of the present invention, are specified in various IETF documents, in particular in RFC 6824 "TCP Extensions for Multipath Operation with Multiple Addresses".

In an MPTCP connection, one logical connection consists of multiple connections (generally denoted as subflows) using different paths. Insofar, MPTCP relies on the existence of multiple paths at the end-systems. Typically, multiple paths are provided through different IP addresses obtained by different ISPs. For instance, deploying a hybrid access mechanism on a CPE (Customer-Premises Equipment) that provides multiple paths from the CPE to a service end-point is advantageous for the use of MPTCP connections.

However, MPTCP as developed so far comes along with a disadvantage. Content service delivery providers try to minimize the distance that data travels over the Internet by placing their content server close to or within the requesting ISP network. With the provision of MPTCP with two or more paths deployed, for instance, in combination with hybrid access as mentioned above, a DNS request for a content server will most likely choose the optimal location for the first path. However, this location is not necessarily the best location for the second or any further path and not for the aggregation of all paths.

SUMMARY

In an embodiment, the present invention provides a method of managing a multipath TCP (MPTCP) connection. The method includes establishing the MPTCP connection as a logical connection between end-points that utilizes multiple network paths with one TCP subflow per network path. At least two subflows of the MPTCP connection are terminated at different end-points.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
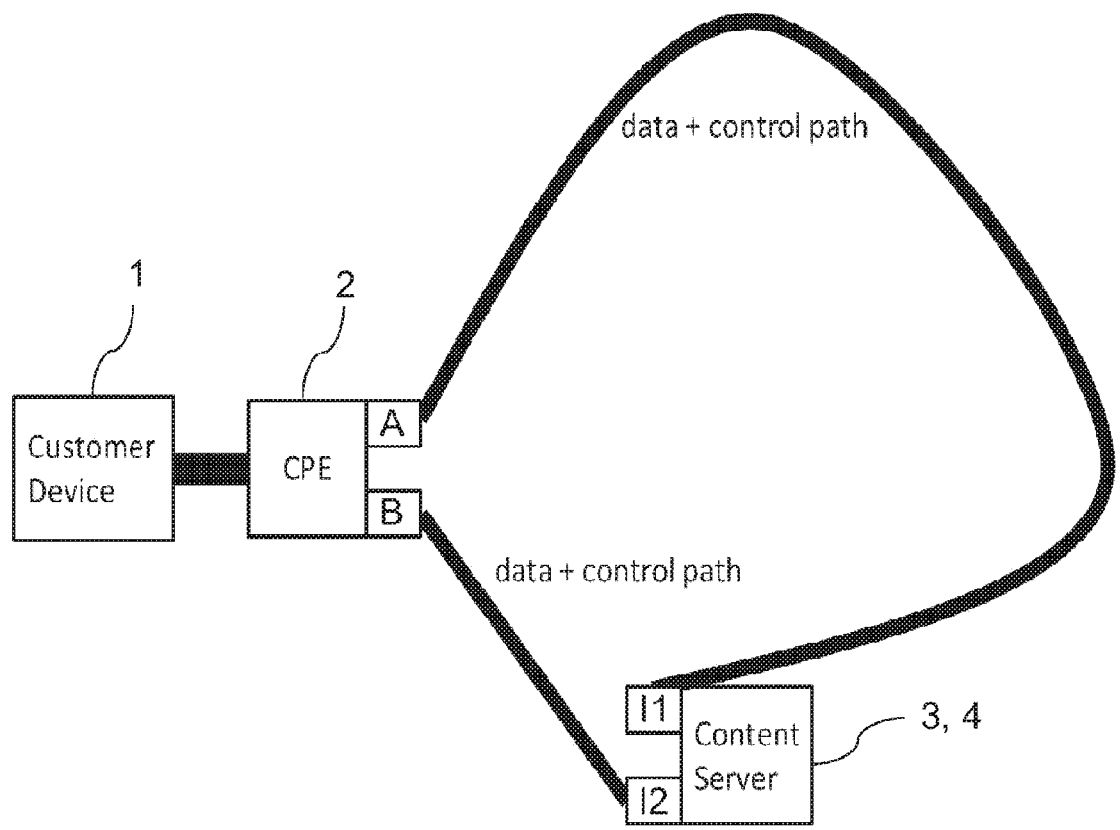
FIG. 1 is a schematic view illustrating an MPTCP scenario according to the prior art with a CPE being connected to one content server using different network paths.

Embodiments of the present invention provide a method of managing an MPTCP connection and a network device of the above type in such a way that data transmissions performed in the context of MPTCP connection are improved in terms of minimizing data travel distances.

According to an embodiment a method is characterized in that at least two subflows of an MPTCP connection are terminated at different end-points.

An MPTCP connection is a logical end-to-end connection where the data is spread over several subflows which might take different routes to the end-points. According to embodiments of the present invention it has been recognized that the above objective can be accomplished by allowing the different subflows of an MPTCP connection to terminate on different end-points. More specifically, according to embodiments of the present invention different subflows of the same MPTCP connection terminate at different IP addresses on end-points with (possibly) different locations, i.e. different subflows have physically different end-points. The different end-points appear like a single MPTCP end-point and insofar the proposed technique is transparent to a client's MPTCP end-point.

Embodiments of the present invention extend standard MPTCP techniques to distributed servers, which implement a distributed MPTCP stack. Embodiments of the invention allow optimizing the placement of CDNs regarding an application with multi-path connections. The optimal location of a content server for each different path can be used. As a result, by taking advantage of the flexibility in selecting the different end-points of an MPTCP connection, as is done by embodiments of the present invention, data connections can be significantly shortened, i.e. the distances that data to be transmitted in an MPTCP connection has to travel over the Internet can be minimized.

Embodiments of the present invention can be suitably applied in connection with distributed applications that provide large data volume to a client, e.g. a streaming server.

According to an embodiment of the invention, the different end-points may be tightly linked with a specific application. This means that the different subflow end-points serve only dedicated connections that are related to the respective application. For instance, a suitable application would be a file download from a content server, e.g., from a movie server.

In order to assure consistency, it may be provided that the content on each of the different end-points is identical. In some embodiments it may be provided that not the entire content of an end-point is replicated with identical data for each possible end-point, but only the content that belongs to or is associated with the specific application the different subflow end-points of the MPTCP connection are linked with.

With respect to a seamless coordination of the different subflows, in a preferred embodiment the different end-points of the MPTCP connection are kept in synchronization with each other, i.e. in other words a stack synchronization between subflow end-points is performed.

For coordination purposes, in some embodiments it may be provided that a subflow control connection is established between the different end-points. This subflow control connection may be configured to carry MPTCP stack state information, in particular information on send buffer and window sizes, and/or application state information, in particular information on the current file pointer of an application data stream transmitted via the MPTCP connection. Alternatively or additionally, token handling, flow control and/or user data offsets may be controlled and/or regulated via the sub flow control connection.

To establish and maintain a control protocol connection between the different end-points, it is necessary to have connectivity between these distributed MPTCP end-points. In case the control connection between a pair of different end-points breaks down, it may be provided that one of the end-points continues the MPTCP connection, while the other of the end-points terminates the MPTCP connection (i.e., more specifically, the other of the end-points discontinues its subflow connection).

According to preferred embodiments, a first connection request is sent from a client terminal to a first server, and a first IP address of the client terminal is utilized for establishing, via a first interface of the client terminal, a first subflow between the client terminal and the first server. In a specific scenario, for instance, the first server could be a content server, and the client terminal could be a communication device having hybrid access, for instance including a fixed line interface (e.g., DSL) as a first interface and an LTE interface as a second interface. As will be easily appreciated by those skilled in the art, the communication device may comprise more than two different interfaces and may be capable of using communication technologies different from the ones mentioned above.

According to preferred embodiments, the first server is configured to determine a second server and to establish a subflow control connection to the second server.

According to preferred embodiments, a second IP address of the client terminal, e.g. associated with a second interface as mentioned above, is announced to the second server, and the IP address of the second server is advertised via the first server to the client terminal for establishing a second subflow from the client terminal's second IP address to the second server's IP address.

Preferably, in order to minimize the distance that data exchanged via the MPTCP connection has to travel over the Internet, a server that is topologically located close to the advertised second IP address of the client terminal is chosen as the second server.

With respect to enabling the client terminal to utilize MPTCP, it may be provided that the client terminal comprises an MPTCP proxy on a Customer-Premises Equipment, CPE, or that the client terminal uses a standard MPTCP aware networking stack.

According to an embodiment of the invention, a network device is characterized in that said network device comprises a distributed MPTCP stack, and synchronization means for keeping the state of said distributed MPTCP stack synchronized with the state of a distributed MPTCP stack of at least one other of said end-points of said MPTCP connection.

A network device according to an embodiment of the present invention utilizes a distributed MPTCP technique. With the proposed distributed MPTCP technique it is not necessary anymore for the subflows to terminate on the same end-point. Instead they terminate on different ones and a multipath stack synchronization is implemented, which keeps the subflow end-points in sync. For instance, the latter can be achieved with a subflow control connection that regulates token handling and subflow flow control between the different end-points. This approach is transparent to the client's MPTCP end-point—be it an MPTCP proxy on the CPE or a client host using a standard MPTCP aware networking stack.

According to preferred embodiments, the network device may be configured to establish and/or operate a subflow control connection with at least one other of the end-points of an MPTCP connection in order to ensure synchronization between them.

FIG. 1 schematically illustrates a typical MPTCP scenario according to the prior art. A customer device 1 deploys a hybrid access mechanism on a CPE 2 that provides multiple paths from the CPE 2 to a service end-point 3. In the scenario illustrated in FIG. 1 the service end-point 3 is a content server 4, e.g. a movie server. The MPTCP connection established between customer device 1 and the content server 4 is a logical end-to-end connection where the data is spread over several subflows which might take different routes.

Specifically, in FIG. 1, the CPE 2 includes two interfaces, denoted A and B, where interface A could provide, e.g., a fixed line (in particular DSL) connection and interface B could provide a radio (in particular LTE) connection. As will be easily appreciated by those skilled in the art, the CPE 2 may comprise more than two interfaces, and the deployed interfaces may be related to different communication technologies than the ones mentioned above.

Similarly, the content server 4 also includes a number of interfaces. The two interfaces of content server 4 that are illustrated in FIG. 1 are denoted I1 and I2.

The MPTCP connection established between customer device 1 and content server 4 consists of a first connection, i.e. subflow, established between interface B of CPE 2 and interface I2 of content server 4. Typically, the content server for an MPTCP connection is selected in such a way that a DNS request for a content server will most likely choose the optimal location for the first path, such that the distance the data travels over the Internet is minimized. Consequently, in the scenario of FIG. 1 content server 4 has been selected to be topologically close to the IP address associated with interface B of CPE 2.

As shown in FIG. 1, after the first subflow has been established, a second connection is established between interface A of CPE 2 and interface I1 of content server 4. For this second connection, depending on the IP address associated with interface A of CPE 2, the location of the selected content server 4 is not necessarily the best topological location in terms of a minimization of the distance to be traveled by that date that is exchanged between CPE 2 and content server 4 via the second subflow. In FIG. 1 this effect is indicated by the line that connects interface A of CPE 2 with interface I1 of content server 4, which is depicted much longer than the line that connects interface B of CPE 2 with interface I2 of content server 4. Generally, the same applies for any further subflow that will likewise suffer from a suboptimal location of the content server 4 once selected.

Figure 2:
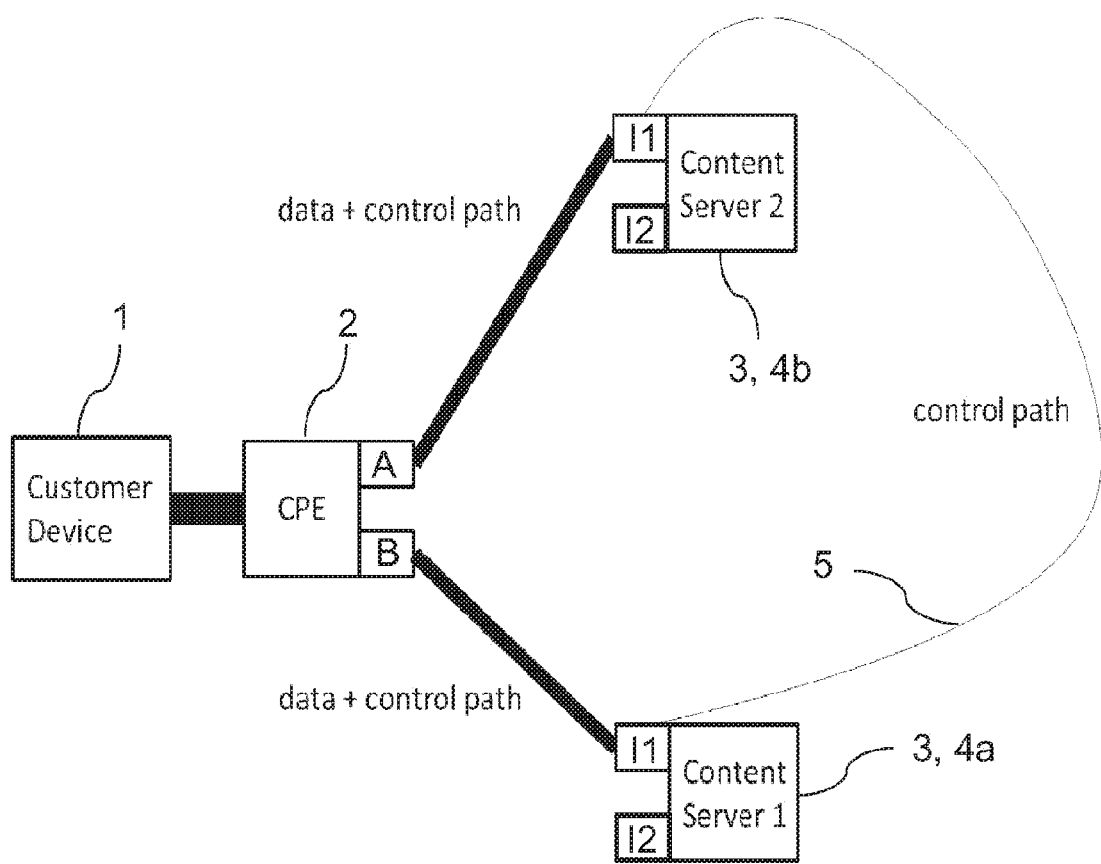
FIG. 2 is a schematic view illustrating an MPTCP scenario with a CPE being connected to two different content servers using different/disjunctive network paths in accordance with an embodiment of the invention.

Turning now to FIG. 2, this figure illustrates a first embodiment of the present invention where the two subflows of the MPTCP connection are terminated at different end-points, thereby overcoming the deficiencies explained in connection with FIG. 1.

In the scenario illustrated in FIG. 2, where same reference numerals denote same components as in FIG. 1, the client/customer site is identical to the situation as shown in FIG. 1. Likewise, the customer device 1 deploys a hybrid access mechanism on CPE 2 for establishing an MPTCP connection towards an MPTCP end-point. In the illustrated scenario the MPTCP connection is assumed to be established by performing the following steps:

A first connection request is sent from customer device 1 to a first content server 4a. This first request results in a first subflow established between interface B of CPE 2 and interface I1 of content server 4a.

The customer device 1 advertises its second IP address associated with interface A on CPE 2 (hereinafter sometimes briefly denoted IP address A) to content server 4a by initiating a subflow connection from IP address A to content server 4a. Content server 4a utilizes this path information (i.e. IP address A) to choose a suitable content server (topologically) close to the origin of this second path. In the embodiment of FIG. 2 this second content server chosen by the first content server 4a is denoted content server 4b. Content server 4a establishes a subflow control connection 5 to content server 4b and informs content server 4b about customer device 1.

Content server 4a, upon receiving a connection attempt from customer device 1 via interface A, drops or accepts this connection attempt. Thereafter, content server 4a advertises an IP address of the chosen content server 4b to the customer device 1. The important matter is that the server 4a learns about the second IP address A of the customer device 1. In case there is no path from customer device's 1 interface A to server 4a there could be other means for server 4a to learn about the customer device's 1 second IP address A, like some local information server, or to just assume the existence of a second IP address, and content server 4a advertises an IP address of the chosen content server 4b to the customer device 1.

By using standard MPTCP techniques, the customer device 1 now tries to establish two new subflows: a subflow from interface A to content server 4b and a subflow from interface B to content server 4b.

Content server 4a instructs content server 4b via the subflow control connection 5 about necessary information to accept a new subflow of the customer device's 1 second IP address A to allow for a connection between interface A on CPE 2 and content server 4b (here via interface I1) and to drop or accept a subflow creation attempt from the client's first IP address (i.e., IP address B). By default, standard MPTCP tries to set up a full mesh set of subflows between end-point's interfaces.

Finally, only two subflows are established between the customer device 1 and the content servers: one subflow between customer device 1 and first content server 4a (via interface B on CPE 2) and one subflow between customer device 1 and second content server 4b (via interface A on CPE 2). Consequently, data flows now from both content servers 4a, 4b to the customer device 1 in a synchronized way, i.e. MPTCP conform. Details of the synchronization procedure will be explained hereinafter in connection with the embodiment shown in FIG. 3.

Figure 3:
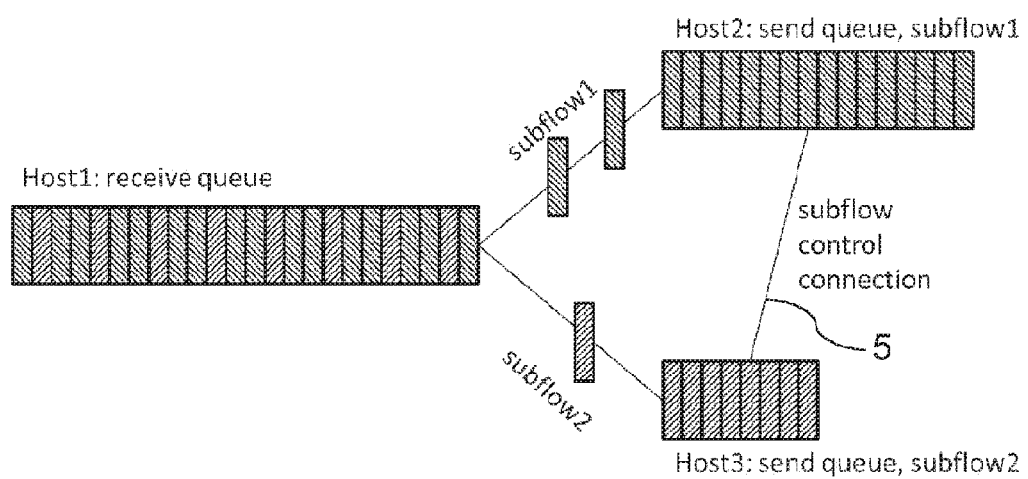
FIG. 3 is a schematic view illustrating a subflow control connection synchronizing two different subflows in accordance with an embodiment of the invention.

The embodiment illustrated in FIG. 3 relates to an MPTCP connection between host1 at the client/receiver site and the servers host2 and host3 at the server/sender site. Via subflow1 data is transmitted from the send queue of host2 to the receive queue of host1. Similarly, via subflow2 data is transmitted from the send queue of host3 to the receive queue of host1. An additional subflow control connection 5 connects the subflow end-points host2 and host3 with each other in order to keep MPTCP stack and attached application on these different end-points in sync, in particular by exchanging flow control information and user data offsets.

The subflow end-points host2 and host3 are tightly linked with an application and serve only dedicated connections related to this application. It is noted that host1 and host2 are replicated with identical data, at least with respect to the application to which they are linked, in order to assure that subflows have access to the same user data to be transferred. Consequently, parts taken from different data servers (i.e. either host2 or host3 in FIG. 3) are put together in the client's (i.e. host1) MPTCP stack under the assumption these parts originate from the same source.

The distributed sending strategy of the different servers, i.e. host2 and host3 in the embodiment of FIG. 3, which is coordinated via subflow control connection 5, depends on the packet scheduler like with standard MPTCP (i.e., lowest RTT first, or round robin)—but with the difference that the state of the distributed MPTCP stacks like send buffer must be kept in sync.

In case of server failure it may be provided that the standard MPTCP mechanisms for packet re-sending and ack-forwarding apply and that other servers that function as subflow end-point of the MPTCP connection get immediately informed. This principle generally holds because the client's site uses standard MPTCP and the server site acts like a single MPTCP end-point. For instance, in case host2 in the embodiment of FIG. 3 breaks down, host3 gets informed via the subflow control connection 5 and the MPTCP connection is continued with host3 as single subflow end-point (and by potentially establishing new subflows to other server end-points).

The sync-protocol of the subflow control connection 5 carries not only MPTCP stack state like send buffer and window sizes but also certain application state like the current file pointer of the application data stream. Since, generally, multiple subflows (i.e. subflow1 and subflow2 in FIG. 3) are terminated at different servers (i.e. host1 and host2 in FIG. 3), only that much information is exchanged via subflow control connection 5 so that each server's packet scheduler can decide on which data to add to its send buffer.

It should be noted that the more frequent the conditions of the different subflows change, the more traffic incurs via the subflow control connections between the servers. If the conditions of one or more of the different subflow connections between client and servers change too quickly the increased data on the subflow control path for state synchronization between the servers might adversely affect the load on the data path. A fallback to fewer servers might be a solution in this situation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method of managing a multipath TCP (MPTCP) connection, the method comprising:
   establishing the MPTCP connection as a logical connection between end-points that utilize multiple network paths with one TCP subflow per network path by:
      sending a first connection request from a client terminal to a first server,
      utilizing a first IP address of the client terminal for establishing, via a first interface of the client terminal, a first subflow between the client terminal and the first server,
      determining, by the first server, a second server, and
      establishing, by the first server, a subflow control connection with the second server,
   wherein at least two subflows of the MPTCP connection are terminated at different end-points.

2. The method according to claim 1, wherein the different end-points are linked with a specific application.

3. The method according to claim 2, wherein content on each of the different end-points and related to the specific application the different end-points are linked with is identical.

4. The method according to claim 1, wherein the different end-points are kept in synchronization with each other.

5. The method according to claim 1, wherein a subflow control connection is established between the different end-points.

6. The method according to claim 5, wherein the subflow control connection carries at least one of MPTCP stack state information on send buffer and window sizes and application state information on a current file pointer of an application data stream.

7. The method according to claim 5, wherein at least one of token handling, flow control, and user data offsets are controlled and/or regulated via the subflow control connection.

8. The method according to claim 5, wherein one of the different end-points continues the MPTCP connection and the other of the different end-points terminates the MPTCP connection if the control connection between said different end-points breaks down.

9. The method according to claim 1, further comprising the steps of:
   announcing a second IP address of the client terminal to the second server, and
   advertising an IP address of the second server to the client terminal for establishing, via a second interface of the client terminal, a second subflow to the second server.

10. The method according to claim 1, wherein a server close to the second IP address of the client terminal is determined as the second server.

11. The method according to claim 1, wherein the client terminal includes an MPTCP proxy on a Customer-Premises Equipment (CPE) or wherein the client terminal uses a standard MPTCP aware networking stack.

12. A network device configured to act as an end-point in a multipath TCP (MPTCP) connection, wherein the MPTCP connection is established as a logical connection between end-points that utilize multiple network paths with one TCP subflow per network path, the network device comprising:
   a distributed MPTCP stack; and
   a synchronizer for keeping a state of the distributed MPTCP stack synchronized with a state of a distributed MPTCP stack of at least one other endpoint of the MPTCP connection,
   wherein the network device is configured to receive a first connection request from a client terminal, utilize a first IP address of the client terminal to establish, via a first interface of the client terminal, a first subflow connection with the client terminal, determine a second server, and establish a subflow control connection with the second server.

13. The network device according to claim 12, wherein the second server is an endpoint of the MPTCP connection.

14. A method of managing a multipath TCP (MPTCP) connection, the method comprising:
   establishing the MPTCP connection as a logical connection between end-points that utilize multiple network paths with one TCP subflow per network path, wherein at least two subflows of the MPTCP connection are terminated at different end-points;
   establishing a subflow control connection between the different end-points; and
   in response to the subflow control connection between the different end-points breaking down, continuing, by one of the different end-points, the MPTCP connection and terminating, by a second of the different end-points, the MPTCP connection.

* * * * *